United States Patent
Xu et al.

(10) Patent No.: US 11,706,697 B2
(45) Date of Patent: Jul. 18, 2023

(54) METHOD FOR SENDING SIGNAL CHANNEL, AND BASE STATION, STORAGE MEDIUM AND ELECTRONIC APPARATUS

(71) Applicant: ZTE CORPORATION, Guangdong (CN)

(72) Inventors: Hanging Xu, Shenzhen (CN); Yajun Zhao, Shenzhen (CN); Ling Yang, Shenzhen (CN); Xincai Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/061,694

(22) Filed: Oct. 2, 2020

(65) Prior Publication Data

US 2021/0153107 A1 May 20, 2021

Related U.S. Application Data

(63) Continuation of application No. PCT/CN2019/081322, filed on Apr. 3, 2019.

(30) Foreign Application Priority Data

Apr. 4, 2018 (CN) .......................... 201810299874.X

(51) Int. Cl.
*H04W 48/16* (2009.01)
*H04W 56/00* (2009.01)
(Continued)

(52) U.S. Cl.
CPC ........... *H04W 48/16* (2013.01); *H04L 5/0048* (2013.01); *H04W 56/001* (2013.01); *H04W 72/30* (2023.01); *H04W 72/53* (2023.01)

(58) Field of Classification Search
CPC ............... H04W 48/16; H04W 56/001; H04W 72/0493; H04W 72/005; H04W 72/30; H04W 72/53
See application file for complete search history.

(56) References Cited

U.S. PATENT DOCUMENTS

2016/0073366 A1 3/2016 Ng et al.
2019/0037481 A1* 1/2019 Zhang ..................... H04L 27/26
(Continued)

FOREIGN PATENT DOCUMENTS

| CN | 105580297 A | 5/2016 |
|---|---|---|
| WO | WO-2017/010773 A1 | 1/2017 |
| WO | WO-2017/190269 A1 | 11/2017 |

OTHER PUBLICATIONS

Ericsson: "3GPP TSG RAN WGl Meeting #92 RI-1802777 On the Introduction of a Discovery Reference Signal" Mar. 2, 2018 (Mar. 2, 2018), Athens, Greece (3 pages).
(Continued)

*Primary Examiner* — Michael Thier
*Assistant Examiner* — Prince A Mensah
(74) *Attorney, Agent, or Firm* — Foley & Lardner LLP

(57) ABSTRACT

Provided are a method for sending a signal channel, a base station, a storage medium, and an electronic apparatus. The method includes the following steps: a signal channel is configured, where the signal channel is used for cell search, synchronization and measurement; and the signal channel is sent to a terminal.

18 Claims, 4 Drawing Sheets

(51) Int. Cl.
*H04L 5/00* (2006.01)
*H04W 72/30* (2023.01)
*H04W 72/53* (2023.01)

(56) References Cited

U.S. PATENT DOCUMENTS

| | | | | |
|---|---|---|---|---|
| 2019/0159226 A1* | 5/2019 | Ly | .................... | H04W 56/001 |
| 2019/0246410 A1* | 8/2019 | Zhang | .................... | H04W 28/18 |
| 2019/0306832 A1* | 10/2019 | Si | .................... | H04L 5/001 |
| 2020/0163076 A1* | 5/2020 | Liu | .................... | H04W 72/02 |
| 2021/0045076 A1* | 2/2021 | Tomeba | .................... | H04B 7/0617 |
| 2021/0307068 A1* | 9/2021 | Kim | .................... | H04W 24/10 |

OTHER PUBLICATIONS

International Search Report for PCT Appl. No. PCT/CN2019/081322 dated Jul. 4, 2019 (with English translation, (5 pages).
Nokia et al.: "Potential solutions and techniques for NR unlicensed" 3GPP TSG RAN WGI Meeting #92 RI-1802526, Mar. 2, 2018 (Mar. 2, 2018), Athens, Greece (10 pages).
Samsung: "Potential solutions and techniques for NR-U Operation" 3GPP TSG RAN WGI Meeting #92 RI-1802014, Mar. 2, 2018 (Mar. 2, 2018), Athens, Greece (7 pages).
Extended European Search Report for EP Appl. No. 19781662.2, dated Oct. 28, 2021 (22 pages).
First Canadian Exam Report on CA Appln No. 3095950 dated Nov. 2, 2021 (4 pages).
Intel Corporation: "Enhancements to initial access and mobility for NR-unlicensed" 3GPP TSG RAN WG1 Ad-Hoc Meeting 1901; R1-1900471; Jan. 25, 2019; Taipei, Taiwan (8 pages).
NTT DOCOMO, Inc.: "Remaining issues on Synchronization signal" 3GPP TSG RAN WG1 Meeting AH 1801; R1-1800649; Jan. 26, 2018; Vancouver, Canada (4 pages).
Oppo: "Initial Access and mobility for NR-U"3GPP TSG RAN WG1 Meeting #95; R1-1812802; Nov. 16, 2018; Spokane, USA (7 pages).
ETRI, "DRS transmission over unlicensed carrier" 3GPP TSG RAN WG1 Meeting #82-bis, R1-155830, Oct. 9, 2015, Malmo, Sweden (6 pages).
First Office Action for KR Appl. No. 10-2020-7031719, dated Sep. 21, 2022 (with English translation, 8 pages).
LG Electronics, "Potential solutions for NR unlicensed operation," 3GPP TSG RAN WG1 #92, R1-1802239; Feb. 26-Mar. 2, 2018; Athens, Greece (8 pages).

* cited by examiner

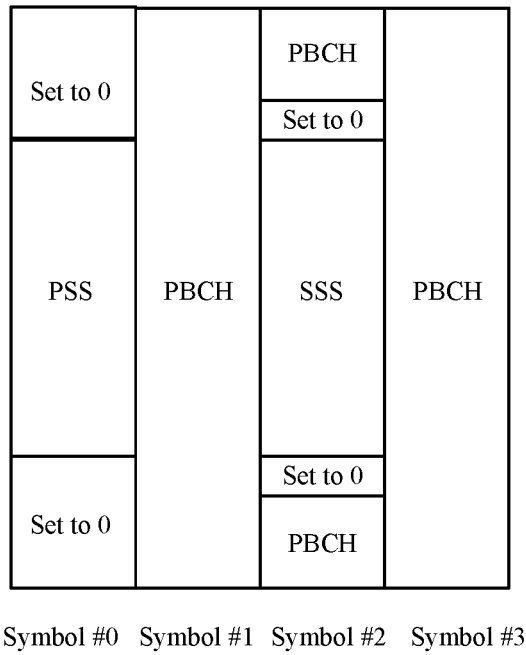
FIG. 4
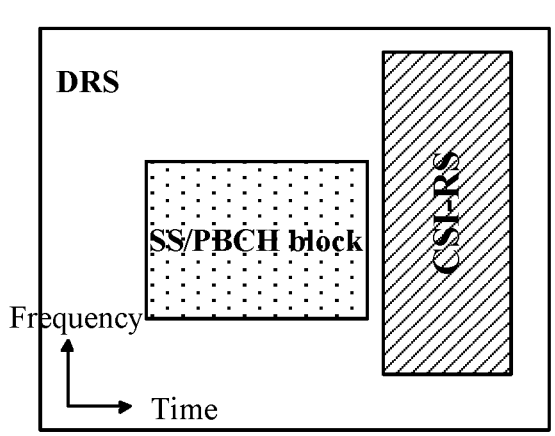
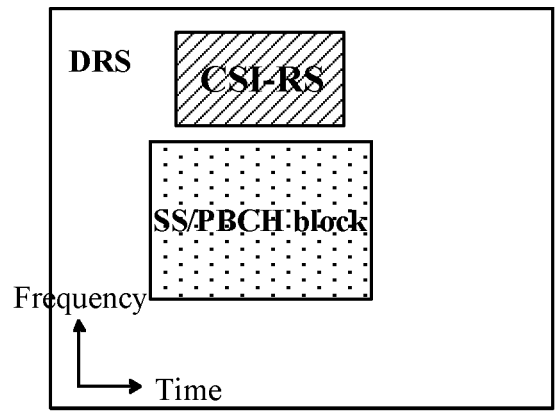
FIG. 5(a)  FIG. 5(b)

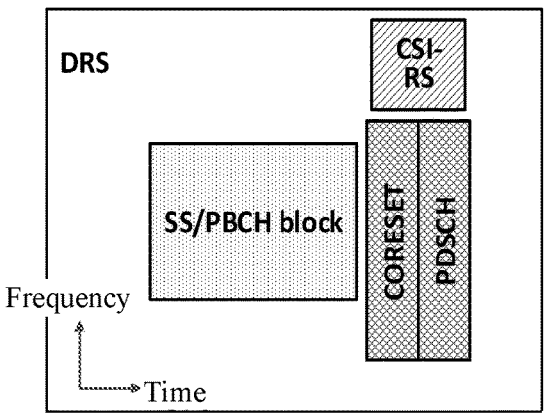 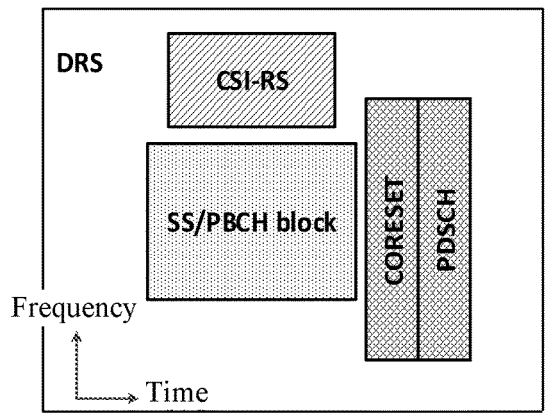
FIG. 6(a)            FIG. 6(b)
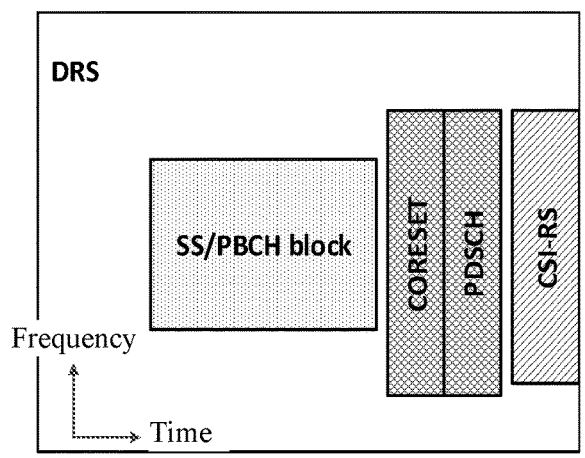
FIG. 6(c)
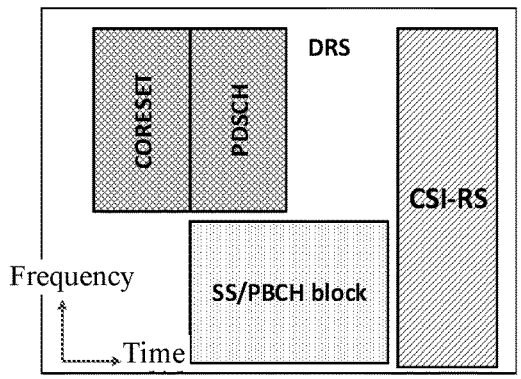 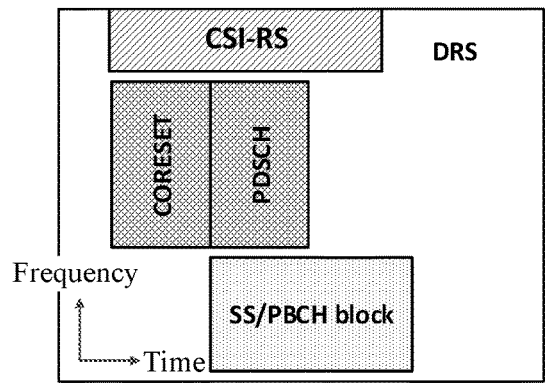
FIG. 7(a)            FIG. 7(b)

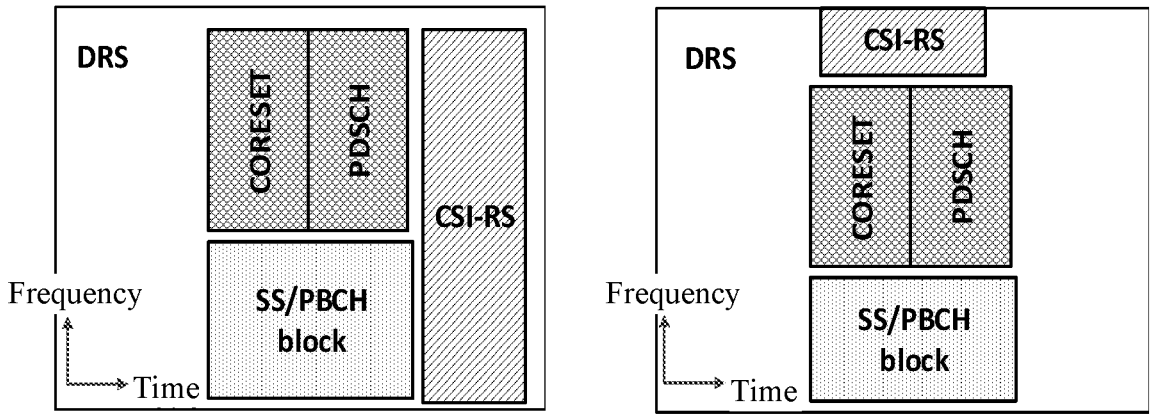
FIG. 8(a)    FIG. 8(b)
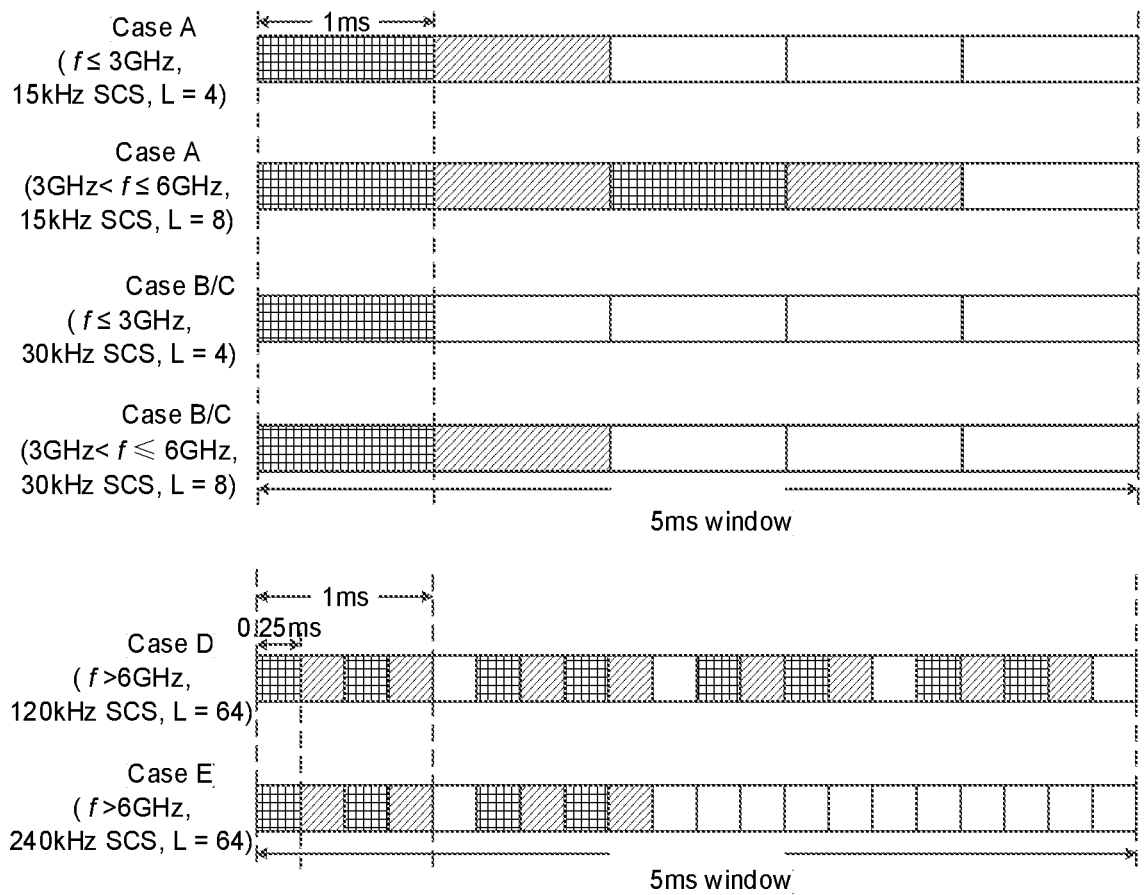
FIG. 9

METHOD FOR SENDING SIGNAL CHANNEL, AND BASE STATION, STORAGE MEDIUM AND ELECTRONIC APPARATUS

CROSS-REFERENCE TO RELATED APPLICATIONS

This application claims the benefit of priority under 35 U.S.C. § 120 as a continuation of PCT Patent Application No. PCT/CN2019/081322, filed on Apr. 3, 2019, which claims priority to Chinese Patent Application No. 201810299874.X, filed on Apr. 4, 2018, the content of each of which is incorporated herein by reference in its entirety.

TECHNICAL FIELD

The present application relates to the field of communications, for example, to a method for sending a signal channel, a base station, a storage medium, and an electronic apparatus.

BACKGROUND

In the related art, many problems exist when an unlicensed carrier is used in new radio (NR). First, in some countries and regions, corresponding regulatory policies exist for the use of an unlicensed spectrum. For example, a device must execute listen before talk (LBT), also referred to as clear channel assessment (CCA), before sending data by using the unlicensed carrier, and merely the device that succeeds in LBT can send data on the unlicensed carrier.

For an operation of the unlicensed carrier, as with an operation of a licensed carrier, how to perform cell search, synchronization and measurement and send necessary system information needs to be considered first. In the related art, in a licensed carrier in NR, a synchronization signal block/physical broadcast channel (SS/PBCH) block (SSB) has functions of cell search, synchronization, measurement and the like. A primary synchronization signal/secondary synchronization signal (PSS/SSS) in the SSB is used for cell search and time-frequency synchronization. The SSS in the SSB is used for L3 radio resource management (L3 RRM) measurement in an idle/inactive/connected state and may also be used for L1-reference signal received power (L1-RSRP) measurement and beam management. In addition, the SSB further includes a physical broadcast channel (PBCH) that carries a master information block (MIB).

Similar to Long Term Evolution-assisted access to unlicensed spectrum (LTE LAA), NR may also define, based on a signal and channel of NR, a new discovery reference signal (DRS) for functions of cell search, synchronization, measurement and the like.

Due to the particularity of the unlicensed carrier, for example, LBT needs to be executed before sending, sending of the SS/PBCH block and/or the discovery reference signal faces uncertainty and is also limited by requirements of rules of an unlicensed frequency band. If the design is not proper, the performance of cell search, synchronization and measurement will be seriously affected.

In view of the preceding problem in the related art, no effective scheme has yet been proposed in the related art.

SUMMARY

Embodiments of the present application provide a method for sending a signal channel, a base station, a storage medium, and an electronic apparatus.

According to an embodiment of the present application, a method for sending a signal is provided. The method includes following steps: a signal channel is configured, where the signal channel is used for cell search, synchronization and measurement; and the signal channel is sent to a terminal.

According to another embodiment of the present application, a base station is provided. The base station includes a configuration module and a sending module. The configuration module is configured to configure a signal channel, where the signal channel is used for cell search, synchronization and measurement. The sending module is configured to send the signal channel to a terminal.

According to another embodiment of the present application, a storage medium is further provided. The storage medium is configured to store a computer program, where the computer program, when executed, performs the steps in any above-mentioned method embodiment.

According to another embodiment of the present application, an electronic apparatus is further provided. The electronic apparatus includes a memory and a processor. The memory is configured to store a computer program and the processor is configured to execute the computer program to perform the steps in any above-mentioned method embodiment.

BRIEF DESCRIPTION OF DRAWINGS

The drawings described herein are used for providing a further understanding of the present application and form a part of the present application. The exemplary embodiments and descriptions thereof in the present application are used for explaining the present application and not to limit the present application in any improper way. In the drawings:

FIG. 4 is a schematic diagram of a structure of an SSB according to an embodiment of the present application;

FIGS. 5(a) and 5(b) show multiplexing manner 1 of a DRS according to an embodiment of the present application;

FIGS. 6(a), 6(b), and 6(c) show multiplexing manner 2 of a DRS according to an embodiment of the present application;

FIGS. 7(a) and 7(b) show multiplexing manner 3 of a DRS according to an embodiment of the present application;

FIGS. 8(a) and 8(b) show multiplexing manner 4 of a DRS according to an embodiment of the present application; and FIG. 9 is a schematic diagram of sending a discovery reference signal or an SS/PBCH block in a window according to an embodiment of the present application.

DETAILED DESCRIPTION

The present application will be described hereinafter in detail with reference to the drawings and in conjunction with embodiments. It is to be noted that the terms "first", "second" and the like in the description, claims and drawings of the present application are used for distinguishing between similar objects and are not necessarily used for describing a particular order or sequence.

Embodiment One

Figure 1:
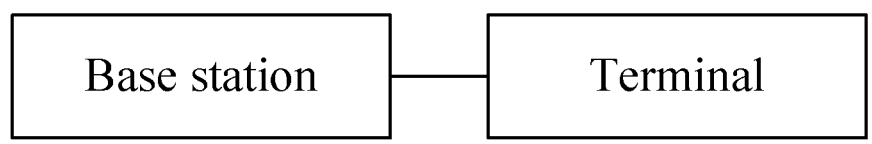
FIG. 1 is a network architecture diagram according to an embodiment of the present application.

The embodiment of the present application may operate on a network architecture shown in FIG. 1. FIG. 1 is a network architecture diagram according to an embodiment of the present application. As shown in FIG. 1, the network architecture includes a base station and a terminal, where information is exchanged between the base station and the terminal.

Figure 2:
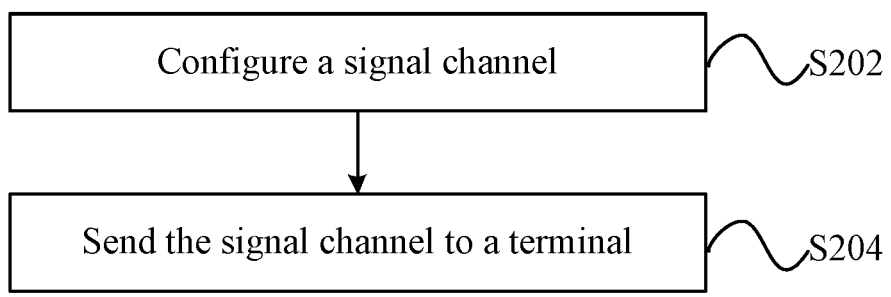
FIG. 2 is a flowchart of a method for sending a signal channel according to an embodiment of the present application.

The embodiment provides a method for sending a signal executed on the network architecture described above. FIG. 2 is a flowchart of a method for sending a signal channel according to an embodiment of the present application. As shown in FIG. 2, the method includes step S202 and step S204.

In step S202, a signal channel is configured.

The signal channel is used for cell search, synchronization and measurement (one or more operations of cell search, cell synchronization and cell measurement).

In step S204, the signal channel is sent to a terminal.

Through the above steps, the sending opportunity of an SSB or a discovery reference signal (DRS) in an unlicensed-carrier scenario can be effectively improved, thus ensuring the functions of cell search, synchronization or measurement, etc., solving the technical problem that the discovery reference signals cannot be fairly sent in the related art, and improving the operating efficiency of the whole network.

In an embodiment, the above steps may be, but are not limited to being, performed by a network side such as a base station.

In the embodiment, the channel signal may be a channel, a signal, or may include a channel and a signal.

In an embodiment, the signal channel includes at least one of the SSB and the DRS.

In a scenario, the DRS includes an SSB, and at least one of the followings: a control resource set (CORESET), a physical downlink shared channel (PDSCH), a channel-state information reference signal (CSI-RS), phase-tracking reference signals (PTRSs), a sounding reference signal (SRS), or paging.

In an embodiment, the manner of configuring the DRS includes examples described below.

The DRS is configured to include the SSB and the CSI-RS. The SSB and the CSI-RS occupy different orthogonal frequency division multiplexing (OFDM) symbols, and the OFDM symbols occupied by the SSB and the CSI-RS are consecutive or inconsecutive in time domain; or the CSI-RS is sent on an OFDM symbol occupied by the SSB, and the CSI-RS is not configured or not sent on a frequency domain resource occupied by a constituent signal channel of the SSB.

The DRS is configured to include the SSB and the CORESET/PDSCH (where the CORESET/PDSCH includes at least one of CORESET or PDSCH). The SSB and the CORESET/PDSCH are multiplexed in time domain, and OFDM symbols occupied by the SSB and the CORESET/PDSCH are consecutive or inconsecutive in the time domain; or the SSB and the CORESET/PDSCH are multiplexed in frequency domain.

The DRS is configured to include the SSB, the CORESET/PDSCH and the CSI-RS. The SSB, the CORESET/PDSCH and the CSI-RS are configured in at least one of the manners described below.

The SSB and the CORESET/PDSCH are multiplexed in time domain, the CSI-RS and the CORESET/PDSCH are frequency division multiplexed, the CSI-RS is sent on an OFDM symbol occupied by the CORESET/PDSCH, and the CSI-RS is not configured or not sent on a frequency domain resource occupied by the CORESET. Alternatively, the SSB and the CORESET/PDSCH are multiplexed in time domain, the CSI-RS and the SSB are frequency division multiplexed, the CSI-RS is sent on an OFDM symbol occupied by the SSB, and the CSI-RS is not configured or not sent on a frequency domain resource occupied by a constituent signal channel of the SSB. Alternatively, the SSB, the CORESET/PDSCH and the CSI-RS are multiplexed in time domain, OFDM symbols occupied by the SSB, the CORESET/PDSCH and the CSI-RS are consecutive or inconsecutive in the time domain, or OFDM symbols occupied by any two or more signal channels among the SSB, the CORESET/PDSCH and the CSI-RS are consecutive. Alternatively, the SSB and the CORESET/PDSCH are multiplexed in frequency domain, and a second multiplexing pattern (a first multiplexing pattern is as described above: the SSB and the CORESET/PDSCH are multiplexed in the time domain) is adopted, where in the second multiplexing pattern, the SSB and the CORESET occupy different OFDM symbols; and the CSI-RS and the CORESET are frequency division multiplexed, the CSI-RS is sent on an OFDM symbol occupied by the CORESET, and the CSI-RS is not configured or not sent on a frequency domain resource occupied by the CORESET. Alternatively, the SSB and the CORESET/PDSCH are multiplexed in frequency domain, the second multiplexing pattern is adopted, the CSI-RS and the SSB are frequency division multiplexed, the CSI-RS is sent on an OFDM symbol occupied by the SSB, and the CSI-RS is not configured or not sent on a frequency domain resource occupied by a constituent signal channel of the SSB. Alternatively, the SSB and the CORESET/PDSCH are multiplexed in frequency domain, the second multiplexing pattern is adopted, the CSI-RS and the SSB or the CORESET/PDSCH are time division multiplexed, the CSI-RS and the SSB or the CORESET/PDSCH occupy different OFDM symbols, and the OFDM symbols occupied by the CSI-RS and the SSB or the CORESET/PDSCH are consecutive or inconsecutive in time domain. Alternatively, the SSB and the CORESET/PDSCH are multiplexed in frequency domain, and a third multiplexing pattern is adopted, where in the third multiplexing pattern, the CORESET and the SSB are on the same OFDM symbol, the CSI-RS and the SSB or the CORESET are frequency division multiplexed, the CSI-RS is sent on the OFDM symbol occupied by the SSB or the CORESET, and the CSI-RS is not configured or not sent on a frequency domain resource occupied by the SSB or the CORESET. Alternatively, the SSB and the CORESET/PDSCH are multiplexed in frequency domain, the third multiplexing pattern is adopted, the CSI-RS and the SSB or the CORESET are time division multiplexed, the CSI-RS and the SSB or the CORESET occupy different OFDM symbols, and the OFDM symbols occupied by the CSI-RS and the SSB or the CORESET are consecutive or inconsecutive in time domain.

In an embodiment, the step in which the signal channel is sent to the terminal includes at least one of the following steps: the signal channel is sent to the terminal in frequency domain; or the signal channel is sent to the terminal in time domain. Examples are given below.

The step in which the signal channel is sent to the terminal in the frequency domain includes at least one of the following steps: the signal channel is sent in the frequency domain, and an occupancy signal is sent on a blank resource of the frequency domain; at least one of at least one signal channel, or at least one CORESET/PDSCH is sent in the frequency domain; the signal channel and the CSI-RS are sent in the frequency domain, and the CSI-RS is prohibited to be sent or prohibited to be configured on a frequency domain resource occupied by a constituent signal channel of the signal channel; a constituent signal channel of the signal channel is sent in the frequency domain by using a subcarrier spacing larger than a preset subcarrier spacing, where if a carrier frequency is less than or equal to 6 GHz, the preset subcarrier spacing is 15 kHz, and if the carrier frequency is greater than or equal to 6 GHz, the preset subcarrier spacing is 60 kHz; or the DRS is sent in the frequency domain by using a time window period greater than a preset time, where the preset time is 5 ms.

The step in which the signal channel is sent to the terminal in the time domain includes at least one of the following steps: a constituent signal channel of the signal channel is sent in the time domain by using a subcarrier spacing larger than a preset subcarrier spacing, where if a carrier frequency is less than or equal to 6 GHz, the preset subcarrier spacing is 15 kHz, and if the carrier frequency is greater than or equal to 6 GHz, the preset subcarrier spacing is 60 kHz; a constituent signal channel of the signal channel is sent in the time domain by using a time window period greater than a preset time, where the preset time is 5 ms; the signal channel is sent to the terminal in the time domain by using a first time window and a second time window, or a constituent signal channel of the signal channel is sent to the terminal in the time domain by configuring two types of periods for a time window; a constituent signal channel of the signal channel is sent in the time domain by using a time window, where a period includes multiple time windows; or multiple candidate signal channels are sent simultaneously at a position of one candidate signal channel and in the time domain, where serial numbers of the multiple candidate signals may be the same or different.

In an embodiment, the step in which the signal channel is sent to the terminal by using the first time window and the second time window includes one of the following steps: the signal channel is sent to the terminal by using the first time window, and when the signal channel fails to be sent in the first time window, the signal channel is sent to the terminal by using the second time window, and/or when the signal channel is sent successfully in the first time window, the first time window continues to be used; or the signal channel is sent to the terminal by using the first time window or the second time window, and when the signal channel is sent successfully in at least one of the first time window or the second time window, a next time window of a current sending window is set to a current time window plus a period of the first time window, and when the signal channel fails to be sent in at least one of the first time window or the second time window, the signal channel is sent to the terminal by using the second time window.

In an embodiment, the candidate position of each SSB (or referred to as the position of a candidate SSB) is the candidate position of a DRS (or referred to as the position of a candidate DRS). The DRS has the same sequence number as the SSB. Before the signal channel is sent to the terminal in a time window, the method further includes the following step: a specified time window for sending the signal channel is determined. The step in which the specified time window for sending the signal channel is determined includes at least one of the following steps:

the specified time window is determined to be equal to an original time window or is obtained by extending a time length of the original time window, where the original time window is half a frame duration of 5 ms;

the signal channel is sent at any candidate position of the signal channel in the specified time window;

one or more candidate positions for sending the signal channel are configured in any time unit of the specified time window, where the time unit includes one of a frame, a subframe, a slot, or an OFDM symbol;

a new candidate SSB is defined in a time unit in which no candidate SSB is defined in the specified time window, where the time unit includes one of a frame, a subframe, a slot, or an OFDM symbol; or when a channel contention fails at a first position of the specified time window, a second position after the first position is set to a candidate position for sending the DRS.

In an embodiment, when a candidate SSB is newly added in the time window, an SSB serial number of the newly added candidate SSB is numbered by one of the following rules: consecutively performing numbering after a maximum serial number of current candidate SSBs; repeating a serial number of an existing candidate SSB; determining a serial number by an association relationship of SSBs to be sent; consecutively performing numbering after a serial number of the first position; or using a serial number which is the same as a serial number of the first position, where the serial number is the same as a preconfigured serial number.

In an embodiment, in the case where a channel contention fails when SSB i is sent, and the channel contention succeeds at a position of a candidate SSB j, an SSB to be sent is numbered according to one of the following rules: using a serial number of the SSB j that is the same as an original serial number; using a serial number of the SSB i that is different from an original serial number; or if two SSBs are sent simultaneously at the position of the candidate SSB j, using a serial number of the SSB i and a serial number of the SSB j, respectively.

From the description of the above embodiments, it will be apparent to those skilled in the art that the method in the above embodiments may be implemented by software plus a necessary general-purpose hardware platform or may of course be implemented by hardware. However, in many cases, the former is a preferred implementation. Based on such understanding, the technical scheme of the present application substantially, or the part contributing to the related art, may be embodied in the form of a software product. The computer software product is stored in a storage medium (such as a read-only memory (ROM)/ random access memory (RAM), a magnetic disk or an optical disk) and includes several instructions for enabling a terminal device (which may be a mobile phone, a computer, a server or a network device) to execute the methods according to the embodiments of the present application.

Embodiment Two

A base station is further provided in this embodiment and is configured for implementing the above-mentioned embodiment and preferred implementations. What has been described will not be repeated. As used below, the term "module" may be at least one of software, hardware or a combination thereof capable of implementing predetermined functions. The apparatus in the embodiment described below is preferably implemented by software, but implementation by hardware or by a combination of software and hardware is also possible and conceivable.

Figure 3:
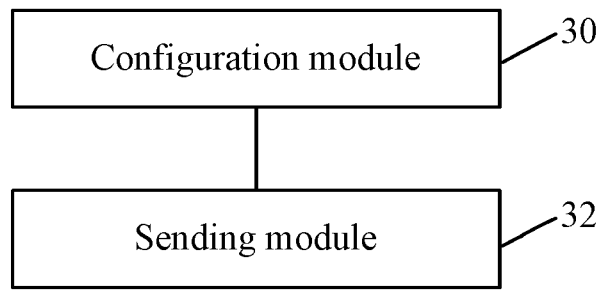
FIG. 3 is a block diagram of a structure of a base station according to an embodiment of the present application.

FIG. 3 is a block diagram of the structure of a base station according to an embodiment of the present application. As shown in FIG. 3, a configuration module 30 and a sending module 32 are included.

The configuration module 30 is configured to configure a signal channel, where the signal channel is used for cell search, synchronization and measurement.

The sending module 32 is configured to send the signal channel to a terminal.

It is to be noted that each module described above may be implemented by software or hardware. Implementation by hardware may be, but is not limited to being, performed in the following manners: the above modules described above are located in the same processor, or the modules described above are located in their respective processors in any combination form.

Embodiment Three

In this embodiment, the sending of an SS/PBCH block (abbreviated as SSB) and/or a discovery reference signal in an unlicensed-carrier scenario is considered, and the sending opportunity of the SS/PBCH block and/or the discovery reference signal is improved on the premise of ensuring fairness.

The embodiment provides a pattern design and/or sending manner of a signal or channel in an unlicensed carrier, where the signal or channel includes an SSB or a discovery reference signal. The discovery reference signal includes an SSB and one or more other signals or channels. The SSB and the discovery reference signal are mainly used for the functions of cell search, time-frequency synchronization, measurement and the like.

The SS/PBCH block (i.e., SSB) in the embodiment corresponds to the SS/PBCH block defined in the 3GPP TS38.211/213-f00. The SSB mainly includes a primary synchronization signal (PSS), a secondary synchronization signal (SSS), a physical broadcast channel (PBCH) and a related demodulation reference signal (DMRS), and occupies four OFDM symbols in time domain and 240 resource elements (REs) in frequency domain. The above signal channels are constituent signals of the SSB. FIG. 4 is a schematic diagram of the structure of an SSB according to an embodiment of the present application.

The embodiment further includes implementation one to implementation six described below.

Implementation One: Signal Constituent of a Discovery Reference Signal

The discovery reference signal at least includes an SSB. The discovery reference signal further includes one or more of the following signal channels: a CORESET, a PDSCH, a CSI-RS, a PTRS, an SRS, or paging. The above signal channels are constituent signals of the DRS.

Some of the above signal channels may be optionally configured. For example, the CSI-RS may be used as an optional configuration signal for the discovery reference signal.

The PBCH carries a master information block (MIB). The PDSCH here carries some remaining other system information, such as at least one of system information block 1 (SIB 1) or other system information (such as an operator identity (ID)). If the discovery reference signal includes the PDSCH, the discovery reference signal also needs to include a DMRS for demodulating the PDSCH. The CORESET is used for sending control information related to sending of the PDSCH. The CSI-RS is used for at least one of the following operations: measurement node identification and sending node identification. The PTRS is used for phase tracking. The SRS is used for uplink channel measurement, and the measurement result may be used for uplink scheduling or downlink sending. The paging is used for sending paging information.

In addition, it should be noted that when the standard is set, the terminology of the discovery reference signal may not be used for regulating the sending of these signal channels, or that the discovery reference signal is merely one or more of the above signal channels, and some other signal channels are not discovery reference signals. For example, the standard merely standardizes the sending of the SSB, the CORESET/PDSCH and the CSI-RS in an unlicensed carrier, but does not refer to these signals collectively as discovery reference signals. Alternatively, the standard merely standardizes that the SSB and the CORESET/PDSCH constitute the discovery reference signal. The CSI-RS is not a discovery reference signal. How to send the CSI-RS as an independent signal together with the discovery reference signal is studied. The method for the discovery reference signal or the SSB in the present application is also suitable for these cases.

The candidate position of each SSB (or referred to as the position of a candidate SSB) within each half frame window is the candidate position of a DRS (or referred to as the position of a candidate DRS). The DRS has the same sequence number as the SSB. Hereinafter, the design for the newly added candidate SSB such as the position of the newly added candidate SSB or the serial number of the SSB and the like is also suitable for the DRS.

Implementation two: Pattern design of a discovery reference signal (or sending of an SSB and other signal channels) The pattern design and configuration of the discovery reference signal is given below. Various cases described below may be freely combined, and the example signal may be replaced by other signal channels, e.g., the CSI-RS may be replaced by the SRS, or paging, or other signal channels.

The following cases apply to both how each constituent signal channel in the DRS is sent and how the signal channels are sent cooperatively (not designed from a DRS perspective). For example, Case 1 applies to both how the constituent signal channels in the DRS, SSB and CSI-RS, constitute the DRS, and how the signal channels, the SSB and the CSI-RS, are sent cooperatively.

Case 1: A DRS at least includes an SSB and a CSI-RS. FIG. 5 shows multiplexing manner 1 of a DRS according to an embodiment of the present application, and includes FIGS. 5(a) and 5(b).

The CSI-RS occupies 1, 2, or 4 OFDM symbols in time domain. The number of ports is 1, 2, 4, 8, or more (at most 32 ports). To reduce DRS overhead and satisfy measurement performance, the number of CSI-RS ports is, for example, 1, or 2, or 4, or 8. For example, the number of CSI-RS time domain symbols, i.e., OFDM symbols, is 1 or 2.

Case 1a: The CSI-RS and the SSB are multiplexed in the time domain, and the CSI-RS and the SSB are consecutive or inconsecutive in the time domain. That is, OFDM symbols occupied by the CSI-RS and the SSB may be consecutive or inconsecutive in the time domain, as shown in FIG. 5(a).

The CSI-RS and SSB are multiplexed in the time domain, which has the advantages that the CSI-RS does not need to avoid a frequency domain resource occupied by the SSB, and that the processing in the frequency domain is simple.

When the CSI-RS and the SSB are multiplexed in the time domain, the CSI-RS and the SSB may be consecutive or inconsecutive in the time domain. The CSI-RS and the SSB are not forced to be consecutive or inconsecutive in the time domain, which is conducive to the flexible configuration of the CSI-RS. However, to avoid a situation where due to the fact that the CSI-RS and the SSB are inconsecutive in the time domain, channel occupancy needs to be performed again when the CSI-RS is sent, the CSI-RS and the SSB may, for example, be configured to be consecutive in the time domain.

When the CSI-RS and the SSB are consecutive in the time domain, the CSI-RS occupies one or more adjacent consecutive symbols preceding or following the SSB.

Case 1b: A CSI-RS and an SSB are multiplexed in frequency domain, and the CSI-RS is not sent on a frequency domain resource occupied by the SSB, as shown in FIG. 5(b). The frequency domain resource here may have the granularity of a PRB. That is, the CSI-RS is not sent on PRBs occupied by the SSB.

The CSI-RS and SSB are multiplexed in the frequency domain, which has the following advantages: no additional time domain symbol needs to be occupied for sending the CSI-RS, the CSI-RS is sent on the OFDM symbol occupied by the SSB, a symbol length of the DRS is not additionally increased, and time domain resource overhead is small.

The CSI-RS and the SSB are multiplexed in the frequency domain, the CSI-RS avoids the frequency domain resource occupied by the SSB, and the CSI-RS is not sent on the PRB occupied by the SSB.

If the CSI-RS merely occupies one OFDM symbol, the CSI-RS may be sent on the first OFDM symbol, the second OFDM symbol, the third OFDM symbol or the fourth OFDM symbol occupied by the SSB.

If the CSI-RS occupies two OFDM symbols, the CSI-RS may be sent on the first and second OFDM symbols, or third and fourth OFDM symbols, or second and third OFDM symbols, or first and third OFDM symbols, or second and fourth OFDM symbols occupied by the SSB.

If the CSI-RS occupies four OFDM symbols, since the SSB occupies four OFDM symbols, the CSI-RS may correspondingly be sent on the four OFDM symbols occupied by the SSB.

Case 2: A DRS includes an SSB and a CORESET/PDSCH. The SSB and the CORESET are multiplexed in time domain. In an embodiment, the DRS may further include a CSI-RS. FIG. 6 shows multiplexing manner 2 of a DRS according to an embodiment of the present application and includes FIGS. 6(a), 6(b) and 6(c).

The SSB and the CORESET/PDSCH are multiplexed in the time domain, and the SSB and CORESET time domain multiplexing pattern corresponds to the SS/PBCH block and control resource set multiplexing pattern 1 defined by the 3GPP TS38.213-f00.

In an embodiment, in consideration of an unlicensed-carrier scenario used by NR-U, the SSB and the CORESET may be limited to be consecutive in the time domain, that is, merely the configuration of the CORESET and the SSB being consecutive in the time domain is adopted. The CORESET is sent on one or more consecutive symbols following the SSB.

In an embodiment, in consideration of the need for the NR-U to minimize the occupancy duration of the discovery reference signal, the number of symbols occupied by the CORESET may be limited. For example, the configuration of merely one OFDM symbol or two OFDM symbols is adopted for the CORESET in the discovery reference signal.

In an embodiment, the signals or channels in the DRS may be limited to use the same subcarrier spacing (SCS) or different SCSs. The use of the same SCS for the signals or channels in the DRS can simplify the design because of the same granularities in the time domain and in the frequency domain. The use of different SCSs for the signals or channels in the DRS is advantageous for reducing the duration occupied in the time domain. For example, the SCS of 15 kHz is adopted for the SSB, while the SCS of 30 kHz is adopted for the CORESET. 1 symbol, 2 symbols or 3 symbols occupied by the SCS of 30 kHz merely respectively correspond to the duration of 0.5 symbols, 1 symbol, or 2 symbols occupied by the SCS of 15 kHz.

If a CSI-RS is also included in the DRS, the CSI-RS may be sent in the following methods.

The CSI-RS occupies 1, 2, or 4 OFDM symbols in the time domain. The number of ports is 1, 2, 4, 8, or more (at most 32 ports). To reduce DRS overhead and satisfy measurement performance, the number of CSI-RS ports is, for example, 1, or 2, or 4, or 8. For example, the number of CSI-RS time domain symbols, i.e., OFDM symbols, is 1 or 2.

Method one: The CSI-RS and the CORESET or the PDSCH are frequency division multiplexed. The CSI-RS is sent on an OFDM symbol occupied by the CORESET or the PDSCH. The CSI-RS is not sent on a frequency domain resource occupied by the CORESET, as shown in FIG. 6(a). The frequency domain resource here may have the granularity of a PRB. That is, the CSI-RS is not sent on PRBs occupied by the CORESET.

Method two: The CSI-RS and the SSB are frequency division multiplexed. The CSI-RS is sent on a symbol occupied by the SSB, and the CSI-RS is not sent on a frequency domain resource occupied by the SSB. The frequency domain resource here may have the granularity of a PRB.

That is, the CSI-RS is not sent on PRBs occupied by the SSB. For example, the multiplexing manner is the same as the multiplexing manner in Case 1b. See FIG. 6(b).

Method 3: The CSI-RS and the SSB are time division multiplexed with the CORESET or the PDSCH. In an embodiment, the SSB, the CORESET/PDSCH, and the CSI-RS occupy different OFDM symbols. For example, the SSB, the CORESET/PDSCH, and the CSI-RS occupy consecutive OFDM symbols. As shown in FIG. 6(c), when the CSI-RS and the SSB or the CORESET/PDSCH are consecutive in the time domain, the CSI-RS occupies one or more adjacent consecutive symbols preceding or following the SSB or the CORESET/PDSCH.

Case 3: A DRS includes an SSB, a CORESET and a PDSCH. The SSB and the CORESET are multiplexed in frequency domain, and the CORESET and the SSB occupy different symbols. In an embodiment, the DRS may further include a CSI-RS. FIG. 7 shows multiplexing manner 3 of a DRS according to an embodiment of the present application and includes FIGS. 7(a) and 7(b).

The SSB and the CORESET/PDSCH are multiplexed in the frequency domain, and the CORESET and the SSB occupy different symbols. The SSB and CORESET time domain multiplexing pattern corresponds to the SS/PBCH block and control resource set multiplexing pattern 2 defined by the 3GPP TS38.213-f00. The frequency domain multiplexing of the SSB and the CORESET/PDSCH can reduce the occupancy duration.

If the CSI-RS is also included in the DRS, the CSI-RS may be sent in the following methods.

The CSI-RS occupies 1, 2, or 4 OFDM symbols in the time domain. The number of ports is 1, 2, 4, 8, or more (at most 32 ports). To reduce DRS overhead and satisfy measurement performance, the number of CSI-RS ports is, for example, 1, or 2, or 4, or 8. For example, the number of CSI-RS time domain symbols, i.e., OFDM symbols, is 1 or 2.

Method one: The CSI-RS and the CORESET are frequency division multiplexed. The CSI-RS is sent on an OFDM symbol occupied by the CORESET. The CSI-RS is not sent on a frequency domain resource occupied by the CORESET, as shown in FIG. 7(b). The frequency domain resource here may have the granularity of a PRB. That is, the CSI-RS is not sent on PRBs occupied by the CORESET.

Method two: The CSI-RS and the SSB are frequency division multiplexed. The CSI-RS is sent on a symbol occupied by the SSB, and the CSI-RS is not sent on a frequency domain resource occupied by the SSB. The frequency domain resource here may have the granularity of a PRB. That is, the CSI-RS is not sent on PRBs occupied by the SSB. For example, the multiplexing manner is the same as the multiplexing manner in Case 1b. See FIG. 7(b).

Method 3: The CSI-RS and the SSB or the CORESET/PDSCH are time division multiplexed. The CSI-RS and the SSB or the CORESET/PDSCH occupy different OFDM symbols. For example, the CSI-RS and the SSB occupy consecutive OFDM symbols. As shown in FIG. 7(a), when the CSI-RS and the SSB or the CORESET/PDSCH are consecutive in the time domain, the CSI-RS occupies one or more adjacent consecutive symbols preceding or following the SSB or the CORESET/PDSCH.

Case 4: A DRS includes an SSB and a CORESET/PDSCH. The SSB and the CORESET are multiplexed in frequency domain, and the CORESET and the SSB occupy the same symbol. In an embodiment, the DRS may further include a CSI-RS. FIG. 8 shows multiplexing manner 4 of a DRS according to an embodiment of the present application and includes FIGS. 8(a) and 8(b).

The SSB and the CORESET/PDSCH are multiplexed in the frequency domain, and the CORESET and the SSB occupy the same symbol. The SSB and CORESET time domain multiplexing pattern corresponds to the SS/PBCH block and control resource set multiplexing pattern 3 defined by the 3GPP TS38.213-f00.

If the CSI-RS is also included in the DRS, the CSI-RS may be sent in the following methods.

The CSI-RS occupies 1, 2, or 4 OFDM symbols in the time domain. The number of ports is 1, 2, 4, 8, or more (at most 32 ports). To reduce DRS overhead and satisfy measurement performance, the number of CSI-RS ports is, for example, 1, or 2, or 4, or 8. For example, the number of CSI-RS time domain symbols, i.e., OFDM symbols, is 1 or 2.

Method one: The CSI-RS and the SSB and/or the CORESET/PDSCH are frequency division multiplexed. The CSI-RS is sent on an OFDM symbol occupied by the SSB or the CORESET. The CSI-RS is not sent on a frequency domain resource occupied by the SSB or the CORESET. The frequency domain resource here may have the granularity of a PRB. That is, the CSI-RS is not sent on PRBs occupied by the SSB or the CORESET. See FIG. 8(b).

Method two: The CSI-RS and the SSB or the CORESET/PDSCH are time division multiplexed. The CSI-RS and the SSB or the CORESET/PDSCH occupy different OFDM symbols. For example, the CSI-RS and the SSB occupy consecutive OFDM symbols. As shown in FIG. 8(a), when the CSI-RS and the SSB or the CORESET/PDSCH are consecutive in the time domain, the CSI-RS occupies one or more adjacent consecutive symbols preceding or following the SSB or the CORESET/PDSCH.

In another aspect of the embodiment, the SSB is configured to be sent together with other signal channels not from the DRS perspective but merely for reducing the number of LBTs and increasing the sending opportunity (merely one LBT needs to be performed). From the perspective of jointly sending the SSB and other signal channels, the configuration manner includes: manner one, manner two and manner three.

Manner one: An SSB and a CSI-RS are jointly sent.

The time-frequency domain configuration of the SSB and the CSI-RS is as described below.

The SSB and the CSI-RS are multiplexed in time domain, and OFDM symbols occupied by the SSB and the CSI-RS are consecutive or inconsecutive in the time domain. Alternatively, the SSB and the CSI-RS are multiplexed in frequency domain, and the CSI-RS is not configured or not sent on a frequency domain resource occupied by a constituent signal channel of the SSB.

Manner two: An SSB and a CORESET/PDSCH are jointly sent.

The time-frequency domain configuration of the SSB and the CORESET/PDSCH is as described below.

The SSB and the CORESET/PDSCH are multiplexed in time domain, and OFDM symbols occupied by the SSB and the CORESET/PDSCH are consecutive or inconsecutive in the time domain. Alternatively, the SSB and the CORESET/PDSCH are multiplexed in frequency domain.

Manner three: An SSB, a CORESET/PDSCH and a CSI-RS are jointly sent.

The time-frequency domain configuration of the SSB, the CORESET/PDSCH and the CSI-RS is as described below.

The SSB and the CORESET/PDSCH are multiplexed in time domain. The CSI-RS and the CORESET or the PDSCH are frequency division multiplexed. The CSI-RS is sent on an OFDM symbol occupied by the CORESET or the PDSCH. The CSI-RS is not configured or not sent on a frequency domain resource occupied by the CORESET.

Alternatively, the SSB and the CORESET/PDSCH are multiplexed in the time domain. The CSI-RS and the SSB are frequency division multiplexed. The CSI-RS is sent on an OFDM symbol occupied by the SSB. The CSI-RS is not configured or not sent on a frequency domain resource occupied by a constituent signal channel of the SSB.

Alternatively, the SSB, the CORESET/PDSCH and the CSI-RS are multiplexed in the time domain. The OFDM symbols occupied by the SSB, the CORESET/PDSCH and the CSI-RS are consecutive or inconsecutive in the time domain.

Alternatively, the SSB and the CORESET/PDSCH are multiplexed in frequency domain, and multiplexing pattern 2 is adopted (the SSB and the CORESET occupy different OFDM symbols). The CSI-RS and the CORESET are frequency division multiplexed. The CSI-RS is sent on the OFDM symbol occupied by the CORESET. The CSI-RS is not configured or not sent on the frequency domain resource occupied by the CORESET.

Alternatively, the SSB and the CORESET/PDSCH are multiplexed in the frequency domain, and multiplexing pattern 2 is adopted (the SSB and the CORESET occupy different OFDM symbols). The CSI-RS and the SSB are frequency division multiplexed. The CSI-RS is sent on the OFDM symbol occupied by the SSB, and the CSI-RS is not configured or not sent on the frequency domain resource occupied by the SSB.

Alternatively, the SSB and the CORESET/PDSCH are multiplexed in the frequency domain, and multiplexing pattern 2 is adopted (the SSB and the CORESET occupy different OFDM symbols). The CSI-RS and the SSB or the CORESET/PDSCH are time division multiplexed. The CSI-RS and the SSB or the CORESET/PDSCH occupy different OFDM symbols. OFDM symbols occupied by the CSI-RS and the SSB are consecutive or inconsecutive in the time domain.

Alternatively, the SSB and the CORESET/PDSCH are multiplexed in the frequency domain, and multiplexing pattern 3 is adopted (the CORESET and the SSB occupy the same OFDM symbol). The CSI-RS and the SSB or the CORESET are frequency division multiplexed. The CSI-RS is sent on the OFDM symbol occupied by the SSB or the CORESET. The CSI-RS is not configured or not sent on the frequency domain resource occupied by the SSB or the CORESET.

Alternatively, the SSB and the CORESET/PDSCH are multiplexed in the frequency domain, and multiplexing pattern 3 is adopted (the CORESET and the SSB occupy the same OFDM symbol). The CSI-RS and the SSB or the CORESET are time division multiplexed. The CSI-RS and the SSB or the CORESET occupy different OFDM symbols. OFDM symbols occupied by the CSI-RS and the SSB or the CORESET are consecutive or inconsecutive in the time domain.

Multiplexing pattern 2 in the above content corresponds to the SSB and CORESET/PDSCH multiplexing pattern 2 defined in the 3GPP 38.213-f00. Multiplexing pattern 3 in the above content corresponds to the SSB and CORESET/PDSCH multiplexing pattern 3 defined in the 3GPP 38.213-f00.

For the DRS or the SSB (not as a constituent signal of the DRS) in the implementation, fast LBT, i.e., CAT 2 in the LAA, without a contention backoff window may be performed merely once before the DRS or the SSB is sent. For example, a sensing interval of a fixed duration is used, and during this sensing duration, the DRS is sent if the channel is idle (sensed energy is less than or equal to a threshold), and the DRS is not sent if the channel is busy (the sensed energy is greater than or equal to the threshold).

In the implementation, the SSB is sent jointly with other signal channels, and the following method one and method two may exist.

Method one: The LBT manner in which the SSB and other signal channels are jointly sent is the same as the LBT manner in which the SSB is separately sent, e.g., each using a sensing interval of a fixed duration without a contention backoff window.

Method two: The LBT manner in which the SSB and other signal channels are jointly sent is different from the LBT manner in which the SSB is separately sent. For example, the LBT manner in which the SSB and other signal channels are jointly sent is the LBT manner with a contention backoff window. Alternatively, a sensing interval of a fixed duration without a contention backoff window is also used for joint sending of the SSB and other signal channels, but this sensing interval is longer than the LBT sensing interval duration when the SSB is separately sent.

The above implementation is also suitable for the joint sending of the DRS and other channel signals. For example, the DRS includes merely the SSB and the CSI-RS, and the above methods are also suitable for the joint sending of the DRS and the CORESET/PDSCH.

In the implementation, constituent signals in the DRS are sent in the time domain, or the SSB and other signal channels are sent together in the time domain, for example, the constituent signals in the DRS are sent consecutively in the time domain, or the SSB and other signal channels are sent consecutively in the time domain. The reason for this is to reduce the number of LBTs, increase the opportunity of accessing unlicensed carriers, and reduce overhead.

Implementation three: Sending of a discovery reference signal or an SS/PBCH block in frequency domain For the sending of an unlicensed carrier, the European Telecommunication Standards Institute (ETSI) defines that an occupied channel bandwidth (OCB) must be between 80% and 100% of the nominal channel bandwidth. Within a channel occupancy time (COT), the occupied channel bandwidth of a device may temporarily be lower than 80% of the nominal channel bandwidth, but not less than 2 MHz.

The OCB of an SSB is related to a subcarrier spacing. The OCB of an SSB with a subcarrier spacing of 15 kHz is 3.6 MHz, and the OCB of an SSB with a subcarrier spacing of 30 kHz is 7.2 MHz, etc. Generally, the nominal bandwidth of a system is at least 5 MHz, and in most scenarios, greater than 5 MHz, e.g., 20 MHz or even wider. In the related art, sending of these in the frequency domain does not satisfy the occupancy requirement of the ETSI for the OCB.

For the sending of the discovery reference signal or the SSB in the frequency domain, the following method one to method six exist.

Method one: When a base station sends an SSB or a discovery reference signal, occupancy signals are sent on a blank frequency domain resource of the SSB or the discovery reference signal. These occupancy signals may be desired signals carrying desired information such as an operator ID or some system information, or may be undesired signals not carrying desired information and merely playing a role of occupying the frequency domain.

Method two: The SSB or the discovery reference signal is repeatedly sent in the frequency domain, and one or more SSBs or discovery reference signals are sent in the frequency domain.

Method three: The SSB or the discovery reference signal and the CORESET/PDSCH are multiplexed in the frequency domain. One or more SSBs or discovery reference signals and CORESET/PDSCHs are sent in the frequency domain. Alternatively, one or more SSBs or discovery reference signals are sent in the frequency domain, while merely one CORESET/PDSCH is sent.

Method four: The SSB or the discovery reference signal and the CSI-RS are multiplexed in the frequency domain. The CSI-RS is not sent on a frequency domain resource occupied by the SSB.

Method five: A relatively large subcarrier spacing is used or the duration of the discovery reference signal is limited, so that the effect on the frequency domain is reduced from the time domain.

For example, a relatively large subcarrier spacing is used. A subcarrier spacing of 30 kHz is used for carrier frequencies below 6 GHz, and a subcarrier spacing of 240 kHz is used for carrier frequencies above 6 GHz.

For another example, the duration of the DRS is limited, e.g., cannot be more than 4, 5, 6, 7, or 14 OFDM symbols, etc.

Method six: The period of an SSB window or the period of a discovery reference signal window is limited. The period of the SSB window or the period of the discovery reference signal window cannot be too small, so that the effect on the frequency domain is reduced from the time domain.

For example, the period of an SSB window (half frame, or referred to as SSB burst set periodicity) in the related art is 5 ms, 10 ms, 20 ms, 40 ms, 80 ms or 160 ms. The minimum period of 5 ms in the related art is too small, and the minimum period of the DRS window or SSB window may be limited to be 20 ms or 40 ms.

Implementation four: Sending (periodic sending) of a discovery reference signal or an SS/PBCH block in time domain The period of an SSB block burst set in the related art is 5 ms, 10 ms, 20 ms, 40 ms, 80 ms or 160 ms. One half frame window (or referred to as SS/PBCH block burst set) exists in each period and is used for sending the SSB.

Method one: The period of an SSB window or the period of a discovery reference signal window is limited and cannot be too small.

The minimum period of an SSB window being 5 ms in the related art is too small. In the NR-U, it may not be necessary that a short period of a NR-U SSB burst set is used for the sending. The minimum period of the DRS window or SSB window may be limited to be 20 ms or 40 ms.

The reason for this is that: from the perspective of a window, one half frame window has already been included for sending the SSB. Multiple opportunities for the sending may be provided. From the perspective of a relatively high LBT priority of the DRS or SSB (i.e., if the SSB LBT priority is relatively high, the sending should not be performed too frequently and needs to be fair to other devices), and the NR-U SSB is not suitable for being sent by using a short period.

Method two: Double periods of an SSB window or a discovery reference signal window are set. A base station configures two periods for the SSB window or the discovery reference signal window, and each period has a respective value set or all the periods share one value set. For example, a value set for a long period is {80 ms, 160 ms}, and a value set for a short period is {10 ms, 20 ms}. The long period is set to be 80 ms and the short period is set to be 10 ms. The double-period setting can effectively improve the sending opportunity of the SSB or the discovery reference signal and does not affect the access of other devices due to too frequent sending.

Especially in the scenario where SSBs are sent through beamforming, multiple beams (e.g., 8 beams) exist, and each SSB corresponds to one beam. In one half frame, when channel contention of beam x corresponding to SSB 0 fails, other beams are required for sending other SSBs and are not suitable for sending SSB 0. The remaining opportunities left for sending SSB 0 in the half frame is not many. Only the last few slots in 5 ms are not defined for an SSB. However, it is possible for 8 beams to attempt to send an SSB again by using these slots.

In this case, a long period may make it difficult to acquire a sending opportunity for the SSB or DRS, and it is not suitable to send the SSB or DRS by using a short period from the perspective of fair and coexistence. Thus, double-period setting may be used for the SSB window or the discovery reference signal window.

The double-period setting method includes two sub-manners described below.

Sub-Manner One: Fixed Long Period and Short Period

The base station attempts to send the SSB or the discovery reference signal in every fixed long-period SSB window or discovery reference signal window, and only if the SSB or discovery reference signal fails to be sent in the long-period SSB window or the discovery reference signal window, the base station attempts to send the SSB or the discovery reference signal again according to a short period. Once the SSB or the discovery reference signal is successfully sent, the process proceeds to the next long-period SSB window or discovery reference signal window, and if the SSB or the discovery reference signal fails to be sent, the base station continues to attempt to send the SSB or the discovery reference signal in a short period.

The subframe described below merely represents an example of a time granularity, and the same applies to time granularities such as a slot, a frame, and a mini-slot.

According to the set long period, a channel contention is performed in the starting subframe t0 or previous subframe of the starting subframe t0 of the long period.

A. If the channel contention in subframe t0 is successful, a signal/data is sent. Subframe t1 for the next channel contention is the subframe of the sequence number of the current subframe plus the long period.

B. If the channel contention in subframe t0 fails, subframe t1 for the next channel contention is the subframe of the sequence number of the current subframe plus the short period.

B.1 If the channel contention in subframe t1 is successful, subframe t2 for the next channel contention is the starting subframe or previous subframe of the starting subframe of the next long period. The starting subframe of the next long period does not necessarily have a long-period relationship with the current subframe. The starting subframe of the next long period is equal to the subframe of the starting subframe of the last long period plus the long period.

B.2 If the channel contention in subframe t1 fails, subframe t2 for the next channel contention is the subframe of the sequence number of the current subframe plus the short period.

An example is given below and it is assumed that an offset is 0.

The starting subframe of a long-period SS/PBCH block burst set is subframe 0, subframe 80, subframe 160, subframe 240, etc.

The starting subframe of a short-period SS/PBCH block burst set is subframe 0, subframe 10, subframe 20, subframe 30, etc.

A. If the channel contention performed by the device in subframe 0 is successful, the channel contention is performed in subframe 80 next time (the position where the next fixed long-period window of subframe 0 is located is subframe 80).

B. If the channel contention performed by the device in subframe 0 fails, the channel contention is performed in subframe 10 next time (Subframe 10=subframe 0+a short period of 10 ms).

B.1 If the channel contention performed by the device in subframe 10 is successful, the channel contention is performed in subframe 80 next time (the position where the next fixed long-period window of subframe 10 is located is subframe 80).

B.2 If the channel contention performed by the device in subframe 10 fails, the channel contention is performed in subframe 20 next time (Subframe 20=subframe 10+a short period of 10 ms).

Sub-Manner Two: Flexible Long Period and Short Period

The base station does not necessarily attempt to send the SSB or the discovery reference signal in every fixed long-period SSB window or discovery reference signal window. No matter the base station successfully sends the SSB or the discovery reference signal in a long-period or short-period SSB window or discovery reference signal window, the position for sending the SSB or the discovery reference signal is equal to the current position plus the long period. If the base station fails to send the SSB or the discovery reference signal, the base station attempts to send the SSB or discovery reference signal according to the short period.

The subframe described below merely represents an example of a time granularity, and the same applies to time granularities such as a slot, a frame, and a mini-slot.

Channel contention is performed in starting subframe t0 or previous subframe of starting subframe t0 of the long period or short period.

A. If the channel contention in subframe t0 is successful, a signal/data is sent. Subframe t1 for the next channel contention is the subframe of the sequence number of the current subframe plus the long period.

B. If the channel contention in subframe t0 fails, subframe t1 for the next channel contention is the subframe of the sequence number of the current subframe plus the short period.

B.1 If the channel contention in subframe t1 is successful, subframe t2 for the next channel contention is the subframe of the sequence number of the current subframe plus the long period.

B.2 If the channel contention in subframe t1 fails, subframe t2 for the next channel contention is the subframe of the sequence number of the current subframe plus the short period.

An example is given below and it is assumed that an offset is 0.

The starting subframe of the long-period and short-period SS/PBCH block burst sets is subframe 0.

A. If the channel contention performed by the device in subframe 0 is successful, the channel contention is performed in subframe 80 next time (Subframe 80=subframe 0+a long period of 80 ms).

B. If the channel contention performed by the device in subframe 0 fails, the channel contention is performed in subframe 10 next time (Subframe 10=subframe 0+a short period of 10 ms).

B.1 If the channel contention performed by the device in subframe 10 is successful, the channel contention is performed in subframe 90 next time (Subframe 90=subframe 10+a long period of 80 ms).

B.2 If the channel contention performed by the device in subframe 10 fails, the channel contention is performed in subframe 20 next time (Subframe 20=subframe 10+a short period of 10 ms).

Method three: Multiple SSB windows or discovery reference signal windows (or referred to as SSB burst sets, or DRS burst sets) exist within the period of one SSB window or the period of one discovery reference signal window. These sets or windows may be consecutive, may be inconsecutive, or may be equally spaced or distributed in sub-periods within a period. For example, the period is 80 ms and multiple SSB burst sets exist in this period. For example, two sets are included, and the two sets are respectively located in subframes 0 to 4 and subframes 5 to 9, where the sets are consecutive; alternatively, the two sets are respectively located in subframes 0 to 4 and subframes 10 to 14; alternatively, the two sets are respectively located in subframes 0 to 4 and subframes 40 to 44, where the sets are equally spaced or distributed in sub-periods within 80 ms. SSB index i may be sent only once in these sets (proceeding to the next period after successful sending) or may be sent multiple times (attempting to be sent in each set).

Implementation five: Sending of a discovery reference signal or an SS/PBCH block in a window The period of an SSB block burst set in the related art is 5 ms, 10 ms, 20 ms, 40 ms, 80 ms, or 160 ms. One half frame window (or referred to as SS/PBCH block burst set) exists in each period and is used for sending the SSB.

Within the half frame window, the carrier frequency is less than or equal to 3 GHz, and L=4, i.e., four candidate SSBs exist. The carrier frequency is greater than 3 GHz but less than or equal to 6 GHz, and L=8, i.e., 8 candidate SSBs exist. The carrier frequency is greater than 6 GHz and L=64, i.e., 64 candidate SSBs exist.

In order to improve the sending opportunity of the SSB or the discovery reference signal, the following method one exists.

Method one: A length of the window (or a length of the SSB burst set) is extended, for example, from a half frame to a frame. More SSBs or DRSs are included in each window or each SSB burst set.

Especially in a scenario where the SSB is sent through beamforming, multiple beams (e.g., 8 beams) exist, and when the carrier frequency is greater than 3 GHz but less than or equal to 6 GHz, the number L of SSBs is 8. Each SSB corresponds to one beam.

In a half frame, when a channel contention of beam x corresponding to SSB 0 fails, other beams are required for sending other SSBs and are not suitable for sending SSB 0. The remaining opportunities left for sending SSB 0 in the half frame is not many. For example, for L=8, the subcarrier spacing is 15 kHz, and merely the last one millisecond of 5 ms is not defined. However, it is possible for these 8 beams each to attempt to send an SSB again by using this one millisecond.

Therefore, the length of the window or the length of the SSB set may be extended, for example, from a half frame to a frame.

More candidate SSBs exist in one window. For example, within a frame window, the carrier frequency is less than or equal to 3 GHz, and L=4*2, i.e., 8 candidate SSBs exist. The carrier frequency is greater than 3 GHz but less than or equal to 6 GHz, and L=8*2, i.e., 16 candidate SSBs exist. The carrier frequency is greater than 6 GHz, and L=64*2, i.e., 128 candidate SSBs exist. In the window, multiple candidate SSBs may correspond to one beam.

Method two: Before the device prepares to send candidate SSB index i or DRS i, the channel contention fails, and SSB index i or DRS i fails to be sent. The device may perform the channel contention before the position of any next candidate SSB or the position of a limited candidate SSB within the window and attempt to send the SSB or the DRS. From the perspective of a user equipment (UE), the UE may assume that the SSB or the DRS will appear at the position of any candidate SSB or at the positions of one or more limited candidate SSBs or DRSs within the window (e.g., half frame).

For example, in a scenario where the SSB is sent through non-beamforming, L candidate SSBs within a window may be used for sending SSBs. It is assumed that a channel contention for SSB index 0 fails, and the device may perform the channel contention before SSB index 1 and attempt to send the SSB again. From the perspective of the UE, the UE will assume that the SSB or the DRS will appear at the position of any candidate SSB within the window (e.g., half frame).

In a scenario where the SSB is sent through beamforming, it is assumed that SSB index 0 corresponds to beam 0, SSB index 2 corresponds to beam 1, and SSB index 4 corresponds to beam 2. If SSB index 0 fails to be sent, the channel contention may be performed at the position of SSB index 1 and the SSB may be attempted to be sent. If SSB index 0 fails to be sent again, the channel contention may not be performed at the position of SSB index 2. That is, in the case where multiple candidate SSBs correspond to one beam within the window, the base station may attempt to send the SSB at positions of these candidate SSBs, and the UE will assume that an SSB may exist at the position of any one of these limited candidate SSBs. From the perspective of the UE, the UE will assume that the SSB or the DRS will appear at the positions of one or more candidate SSBs or DRSs limited within the window (e.g., half frame).

Alternatively, the device may perform the channel contention again at the position of SSB index 2 and attempt to send the SSB on beam 0. The reason for this is that at the position of SSB index 2, beam 1 may be busy while beam 0 is idle. Therefore, a definition may be further made as described below.

Primary candidate SSB: A primary SSB has a high priority.

Secondary candidate SSB: A secondary SSB has a secondary priority.

Alternatively, a definition is made as described below.

Main beam: When a sensing result of a main-beam channel is busy, the SSB is attempted to be sent on a secondary beam. If the sensing result of the main-beam channel is idle, the corresponding SSB is preferentially sent on the main beam.

Secondary beam: When the sensing result of the main-beam channel is busy, the SSB is attempted to be sent on the secondary beam. If the sensing result of the main-beam channel is idle, the corresponding SSB is preferentially sent on the main beam. At this time, the SSB fails to be sent on the secondary beam.

For example, SSB index i corresponds to beam i (i=0, 1, 2, . . . , 7), respectively. At the position of SSB index j, SSB index j is the primary candidate SSB, or beam j is the main beam. A channel contention in beam 0 fails before SSB index 0 is sent. Before SSB index 1 is sent, if a channel contention in beam 1 (main beam) is successful, SSB index 1 is sent on the beam 1. If the channel contention in beam 1 fails while the channel contention in beam 0 (secondary beam) is successful, the SSB is sent on beam 0.

From the perspective of the UE, the UE will assume that the SSB or the DRS will appear at the position of any candidate SSB within the window (e.g., half frame).

In an embodiment, the SSB may be sent simultaneously on two beams at the position of a candidate SSB.

For example, SSB index i corresponds to beam i (i=0, 1, 2, . . . , 7), respectively. A channel contention in beam 0 fails before SSB index 0 is sent. Before SSB index 1 is sent, if a channel contention in beam 1 is successful and the channel contention in beam 0 (secondary beam) is also successful, the SSB may be sent simultaneously on beam 0 and beam 1.

From the perspective of the UE, the UE will assume that the SSB or the DRS will appear at the position of any candidate SSB within the window (e.g., half frame).

In this case, issues of SSB j numbering, rate matching and UE cognition are involved. If sending is performed according to the serial number index 0, the UE has no problem in understanding a beam, but there are problems in timing synchronization and rate matching. On the contrary, if sending is performed according to the serial number index 1, there is no problem in the timing synchronization and the rate matching, but the UE has a problem in understanding the beam.

Method three: Any slot in the window is configured with a candidate position at which an SSB may be sent. In the related art, the positions of candidate SSBs are distributed on merely part of subframes or slots in a half-frame window. The SSB may be sent in any slot within the half frame window. From the perspective of the UE, the UE will assume that the SSB or the DRS will appear in any slot within the half frame window.

For example, for Case A in 38.213-f00, when the carrier frequency is less than or equal to 3 GHz, the subcarrier spacing is 15 kHz, and the number L of candidate SSBs is 4. FIG. 9 is a schematic diagram of sending a discovery reference signal or an SS/PBCH block in a window according to an embodiment of the present application. As shown in FIG. 9, candidate SSBs exist merely within the first two milliseconds of the half frame window in the related art, and candidate SSBs may also be defined within the last three milliseconds of the half frame window. The SSB pattern within each millisecond or each slot may be the same as the existing SSB pattern.

For example, for Case A in 38.213-f00, the carrier frequency is greater than 3 GHz but less than or equal to 6 GHz, the subcarrier spacing is 15 kHz, and the number L of candidate SSBs is 8, as shown in FIG. 9. Candidate SSBs exist merely within the first four milliseconds of the half frame window in the related art, and candidate SSBs may also be defined with the last one millisecond of the half frame window. The SSB pattern with each millisecond or each slot may be the same as the existing SSB pattern.

For example, for Case B and/or Case C in 38.213-f00, when the carrier frequency is less than or equal to 3 GHz, the subcarrier spacing is 30 kHz, and the number L of candidate SSBs is 4, as shown in FIG. 9. Candidate SSBs exist merely within the first one millisecond of the half frame window in the related art, and candidate SSBs may also be defined within the last four milliseconds of the half frame window. The SSB pattern within each millisecond or each slot may be the same as the existing SSB pattern.

For example, for Case B and/or Case C in 38.213-f00, the carrier frequency is greater than 3 GHz but less than or equal to 6 GHz, the subcarrier spacing is 30 kHz, and the number L of candidate SSBs is 8, as shown in FIG. 9. Candidate SSBs exist merely within the first two milliseconds of the half frame window in the related art, and candidate SSBs may also be defined within the last three milliseconds of the half frame window. The SSB pattern within each millisecond or each slot may be the same as the existing SSB pattern.

For example, for Case D and/or Case E in 38.213-f00, the carrier frequency is greater than 6 GHz, the subcarrier spacing is 120 kHz/240 kHz, the number L of candidate SSBs is 64, as shown in FIG. 9, and new candidate SSBs are defined in the slot in the blank part where no SSB is defined. Especially, for Case E, 64 new candidate SSBs may be defined at the positions in the blank part following the half frame window where no SSB is defined.

Implementation six: Generation of a sequence of a discovery reference signal sequence or an SS/PBCH block In the related art, the manner of indexing SSBs defined in 38.213-f00 is as described below.

When the carrier frequency is less than or equal to 3 GHz, the maximum number of SSBs in the half frame window is 4, and the serial numbers are SSB indexes 0 to 3 in sequence.

For subcarrier spacing of 15 kHz, 2 ms (the first two slots) of the half frame window is occupied. For subcarrier spacing of 30 kHz, 1 ms (the first two slots) of the half frame window is occupied.

When the carrier frequency is greater than 3 GHz but less than or equal to 6 GHz, the maximum number of SSBs in the half frame window is 8, and the serial numbers are SSB indexes 0 to 7 in sequence.

For subcarrier spacing of 15 kHz, 4 ms (the first four slots) of the half frame window is occupied. For subcarrier spacing of 30 kHz, 2 ms (the first four slots) of the half frame window is occupied.

When the carrier frequency is greater than 6 GHz, the maximum number of SSBs in the half frame window is 64, and the serial numbers are SSB indexes 0 to 63 in sequence.

For subcarrier spacing of 120 kHz, about 5 ms of the half frame window is occupied. For subcarrier spacing of 30 kHz, about 2.5 ms of the half frame window is occupied.

Case 1: How to number a newly added candidate SSB in the window in the above-mentioned implementation is provided.

For numbering the newly added candidate SSB, the following method one to method three may be adopted.

Method one: The newly added candidate SSB is consecutively numbered after the serial number of the existing candidate SSB.

For example, when the carrier frequency is less than or equal to 3 GHz, the maximum number of SSBs in the half frame window is 4, and the serial numbers are SSB indexes 0 to 3 in sequence; the serial numbers of the newly added SSBs are SSB indexes 4 to x (for subcarrier spacing of 15 kHz); and the serial numbers of the newly added SSBs are SSB indexes 4 to y (for subcarrier spacing of 30 kHz), where x and y are integers greater than or equal to 4. For example, x=9 and y=19.

When the carrier frequency is greater than 3 GHz but less than or equal to 6 GHz, the maximum number of SSBs in the half frame window is 8, and the serial numbers are SSB indexes 0 to 7 in sequence.

The serial numbers of the newly added SSBs are SSB indexes 8 to x (for subcarrier spacing of 15 kHz); and the serial numbers of the newly added SSBs are SSB indexes 8 to y (for subcarrier spacing of 30 kHz) in sequence, where x and y are integers greater than or equal to 8. For example, x=9 and y=19.

When the carrier frequency is greater than 6 GHz, the maximum number of SSBs in the half frame window is 64, and the serial numbers are SSB indexes 0 to 63 in sequence.

x candidate SSBs may be newly added in the window for subcarrier spacing of 120 kHz. The serial numbers of the newly added SSBs are SSB indexes 64 to (64+x−1) in sequence.

y candidate SSBs may be newly added in the window for subcarrier spacing of 240 kHz. The serial numbers of the newly added SSBs are SSB indexes 64 to (64+y−1) in sequence.

Here, x and y are integers greater than or equal to 1. For example, y=64.

The advantage of this numbering method is that there is no problem in timing synchronization and rate matching, but the corresponding relationship with beams needs to be clear.

Method two: The serial numbers of the existing candidate SSBs are repeated in sequence as the serial numbers of the newly added candidate SSBs.

For example, when the carrier frequency is less than or equal to 3 GHz, the maximum number of SSBs in the half frame window is 4, and the serial numbers are SSB indexes 0 to 3 in sequence.

For the subcarrier spacing of 15 kHz, the first two milliseconds of the half frame are occupied; for the subcarrier spacing of 30 kHz, the first one millisecond of the half frame is occupied.

The serial numbers of the SSBs newly added in the third millisecond and the fourth millisecond of the half frame are SSB indexes 0 to 3 (for subcarrier spacing of 15 kHz); the serial numbers of the SSBs newly added in a second millisecond of the half frame are SSB indexes 0 to 3 (for subcarrier spacing of 30 kHz), and so on.

For another example, when the carrier frequency is greater than 3 GHz but less than or equal to 6 GHz, the maximum number of SSBs in the half frame window is 8, and the serial numbers are SSB indexes 0 to 7 in sequence. For the subcarrier spacing of 15 kHz, the first four milliseconds of the half frame are occupied; and for the subcarrier spacing of 30 kHz, the first two milliseconds of the half frame are occupied.

The serial numbers of the SSBs newly added in the fifth millisecond of the half frame are SSB indexes 0 to 1 (for subcarrier spacing of 15 kHz) in sequence, and the serial numbers may be increased in sequence if the length of the window is larger than the half frame; the serial numbers of the SSBs newly added in the third millisecond and the fourth millisecond of the half frame are SSB indexes 0 to 7 (for subcarrier spacing of 30 kHz); and so on.

In this numbering method, the UE has no problem in understanding the beam, but there are problems in the timing synchronization and the rate matching.

Method three: The numbering range of the SSBs is unchanged and still limited by L (when the carrier frequency is less than or equal to 3 GHz, the maximum number L of the SSBs in the window is 4; when the carrier frequency is greater than 3 GHz but less than or equal to 6 GHz, the maximum number L of SSBs in the window is 8; and when the carrier frequency is greater than 6 GHz, the maximum number L of SSBs in the window is 64). The serial number of the newly added candidate SSB is determined by the serial number of the original to-be-sent candidate SSB. In an embodiment, the serial number of the newly added candidate SSB is the same as the serial number of the original to-be-sent candidate SSB.

For example, for the carrier frequency being greater than 3 GHz but less than or equal to 6 GHz, the original candidate SSBs range from SSB 0 to SSB 7. A channel contention performed by the device fails when the device sends the original SSB 0. A channel contention is attempted to be performed before the position of the ninth candidate SSB (sent at the position of the newly added SSB), and if the channel contention is successful, the serial number of SSB 0 is used when the ninth candidate SSB is sent. A DMRS sequence associated to a PBCH is generated by using the serial number of SSB 0.

In this numbering method, the UE has no problem in understanding the beam, but there are problems in the timing synchronization, the rate matching, and how to perform slot timing. A single frequency network (SFN) number may be determined originally according to an SFN, whether the first half frame or the second half frame is determined according to a half frame, and a slot number and symbol timing in the slot may be determined according to an SSB index.

Case 2: When SSB i is sent, a channel contention fails, and a channel contention at a position of another candidate SSB is successful. The sent SSB may be numbered in the following methods.

If SSB index i fails to be sent due to a channel contention failure, SSB index i may be sent at a position of another numbered SSB in the window. For example, the channel contention is performed at the position of SSB index j and the SSB is sent. At this time, whether index i or the original serial number index j is used as the serial number of the SSB sent at the position of another numbered SSB is illustrated here by using the following method one and method two.

Method one: SSB index i corresponds to beam x. The contention for beam x at the position of the original serial number SSB index i fails, and thus SSB index i fails to be sent. Index i is used for the SSB sent through beam x at the original serial number SSB index j.

In this method, there is a problem in the timing synchronization. However, the UE has no problem in understanding a beam.

For example, for SSB Case A in 38.213-f00, the initial symbol of SSB index 0 should be symbol 2 and the initial symbol of SSB index 1 should be symbol 8. If SSB index 0 fails to be sent due to a channel contention failure and a channel contention before the position of SSB index 1 is successful, the SSB is sent. About whether index 0 or index 1 is used for the SSB, it is assumed that index 0 is used, and the UE will regard symbol 8 as symbol 2 when receiving the SSB, and thus a symbol or slot synchronization error occurs.

Rate matching problem: Rate matching is still performed as before, and the problem is not great. For example, 8 bits represents SSB index 0 to SSB index 7 in sequence. If the SSB is successfully sent merely at the position of SSB index 1, 1 is set at the position of the bit corresponding to SSB index 1.

Method two: SSB index i corresponds to beam x. The contention for beam x at the position of the original serial number SSB index i fails, and thus SSB index i fails to be sent. Index j is used for the SSB sent through beam x at the original serial number SSB index j.

That is, the original serial number is used, for example, if SSB index j is at the position, the serial number of j is used.

Problems: Although there is no problem in the timing synchronization and the rate matching, a problem of UE's cognition of beams will be caused.

It may cause the UE to consider that the SSB sent at SSB index 1 is sent by the beam corresponding to SSB index 1, but in fact the SSB sent at SSB index 1 is sent by the beam corresponding to SSB index 0, or sent omnidirectionally.

If SSB is sent through non-beamforming, the problem is not great.

Through the pattern designs and/or sending manners of the SS/PBCH block or the discovery reference signal provided by the embodiment, the sending opportunity of the SS/PBCH block or the discovery reference signal in the unlicensed-carrier scenario can be effectively improved, thus ensuring the functions of cell search, synchronization or measurement, etc.

Embodiment Four

An embodiment of the present application further provides a storage medium. The storage medium stores a computer program. The computer program is configured to, when executed, perform the steps in any above-mentioned method embodiment.

In an embodiment, the storage medium may be configured to store a computer program for executing step S1 and step S2.

In step S1, a signal channel is configured, where the signal channel is used for cell search, synchronization and measurement.

In step S2, the signal channel is sent to a terminal.

In an embodiment, the above-mentioned storage medium may include, but is not limited to, a USB flash disk, a read-only memory (ROM), a random access memory (RAM), a mobile hard disk, a magnetic disk, an optical disk or another medium capable of storing computer programs.

An embodiment of the present application further provides an electronic apparatus. The electronic apparatus includes a memory and a processor. The memory is configured to store a computer program, and the processor is configured to execute the computer program to perform steps in any above-mentioned method embodiment.

In an embodiment, the above-mentioned electronic apparatus may further include a transmission device and an input and output device, where both the transmission device and the input and output device are connected to the preceding processor.

In an embodiment, the processor may be configured to execute steps S1 and S2 described below through the computer program.

In step S1, a signal channel is configured, where the signal channel is used for cell search, synchronization and measurement.

In step S2, the signal channel is sent to a terminal.

For examples in the embodiment, reference may be made to the examples described in the above-mentioned embodiments and optional implementations, which will not be repeated in the embodiment.

Apparently, it should be understood by those skilled in the art that each of the modules or steps of the present application described above may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some cases, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

We claim:

1. A method for sending discovery reference signals (DRSs) in an unlicensed-carrier scenario, the method comprising:
configuring, by a base station, a DRS, wherein the DRS comprises a synchronization signal/physical broadcast channel (SS/PBCH) block (SSB), a control resource set (CORESET) and a physical downlink shared channel (PDSCH), wherein the SSB, the CORESET and the PDSCH of the DRS are limited to use a same subcarrier spacing (SCS);
determining, by the base station, a specified time window for sending the SSB;
configuring, by the base station, at least one candidate SSB position for sending the SSB in a time unit of the specified time window, wherein a new candidate SSB position is configured in a time unit in which no candidate SSB position is defined in the specified time window; and
sending, by the base station, the DRS to a terminal.

2. The method of claim 1, wherein the DRS further comprises a channel-state information reference signal (CSI-RS).

3. The method of claim 1, wherein serial numbers of candidate SSB positions are numbered consecutively.

4. A non-transitory computer readable medium storing instructions, which when executed by at least one processor of a base station, cause the at least one processor to perform the method of claim 1.

5. The method of claim 1, wherein candidate SSB positions in the specified time window are indexed consecutively from 0 to L, wherein L=9 for 15 kHz, L=19 for 30 kHz.

6. A base station, comprising:
at least one processor configured, in an unlicensed-carrier scenario, to:
configure a discovery reference signal (DRS), wherein the DRS comprises a synchronization signal/physical broadcast channel (SS/PBCH) block (SSB), a control resource set (CORESET) and a physical downlink shared channel (PDSCH), wherein the SSB, the CORESET and the PDSCH of the DRS are limited to use a same subcarrier spacing (SCS);
determine a specified time window for sending the SSB;
configure at least one candidate SSB position for sending the SSB in a time unit of the specified time window, wherein a new candidate SSB position is configured in a time unit in which no candidate SSB position is defined in the specified time window; and
send the DRS to a terminal.

7. The base station of claim 6, wherein the DRS further comprises a channel-state information reference signal, CSI-RS.

8. The base station of claim 6, wherein serial numbers of candidate SSB positions are numbered consecutively.

9. The base station of claim 6, wherein candidate SSB positions in the specified time window are indexed consecutively from 0 to L, wherein L=9 for 15 kHz, L=19 for 30 kHz.

10. A method for receiving discovery reference signals (DRSs) in an unlicensed-carrier scenario, the method comprising:
receiving, by a terminal from a base station, a DRS in a specified time window,
wherein the DRS comprises a synchronization signal/ physical broadcast channel (SS/PBCH) block (SSB), a control resource set (CORESET) and a physical downlink shared channel (PDSCH),
wherein the SSB, the CORESET and the PDSCH of the DRS are received over a same subcarrier spacing (SCS),
wherein at least one candidate SSB position is configured for receiving the SSB in a time unit of the specified time window, and
wherein a new candidate SSB position is configured in a time unit in which no candidate SSB position is defined in the specified time window.

11. The method of claim 10, wherein the DRS further comprises a channel-state information reference signal (CSI-RS).

12. The method of claim 10, wherein serial numbers of candidate SSB positions are numbered consecutively.

13. A non-transitory computer readable medium storing instructions, which when executed by at least one processor of a terminal, cause the at least one processor to perform the method of claim 10.

14. The method of claim 10, wherein candidate SSB positions in the specified time window are indexed consecutively from 0 to L, wherein L=9 for 15 kHz, L=19 for 30 kHz.

15. A terminal, comprising:
at least one processor configured, in an unlicensed-carrier scenario, to:
receive a discovery reference signal (DRS) from a base station in a specified time window,
wherein the DRS comprises a synchronization signal/ physical broadcast channel (SS/PBCH) block (SSB), a control resource set, CORESET, and a physical downlink shared channel (PDSCH),
wherein the SSB, the CORESET and the PDSCH of the DRS are received over a same subcarrier spacing (SCS),
wherein at least one candidate SSB position is configured for receiving the SSB in a time unit of the specified time window, and
wherein a new candidate SSB position is configured in a time unit in which no candidate SSB position is defined in the specified time window.

16. The terminal of claim 15, wherein the DRS further comprises a channel-state information reference signal (CSI-RS).

17. The terminal of claim 15, wherein serial numbers of candidate SSB positions are numbered consecutively.

18. The terminal of claim 15, wherein candidate SSB positions in the specified time window are indexed consecutively from 0 to L, wherein L=9 for 15 kHz, L=19 for 30 kHz.

* * * * *